Patented Mar. 31, 1953

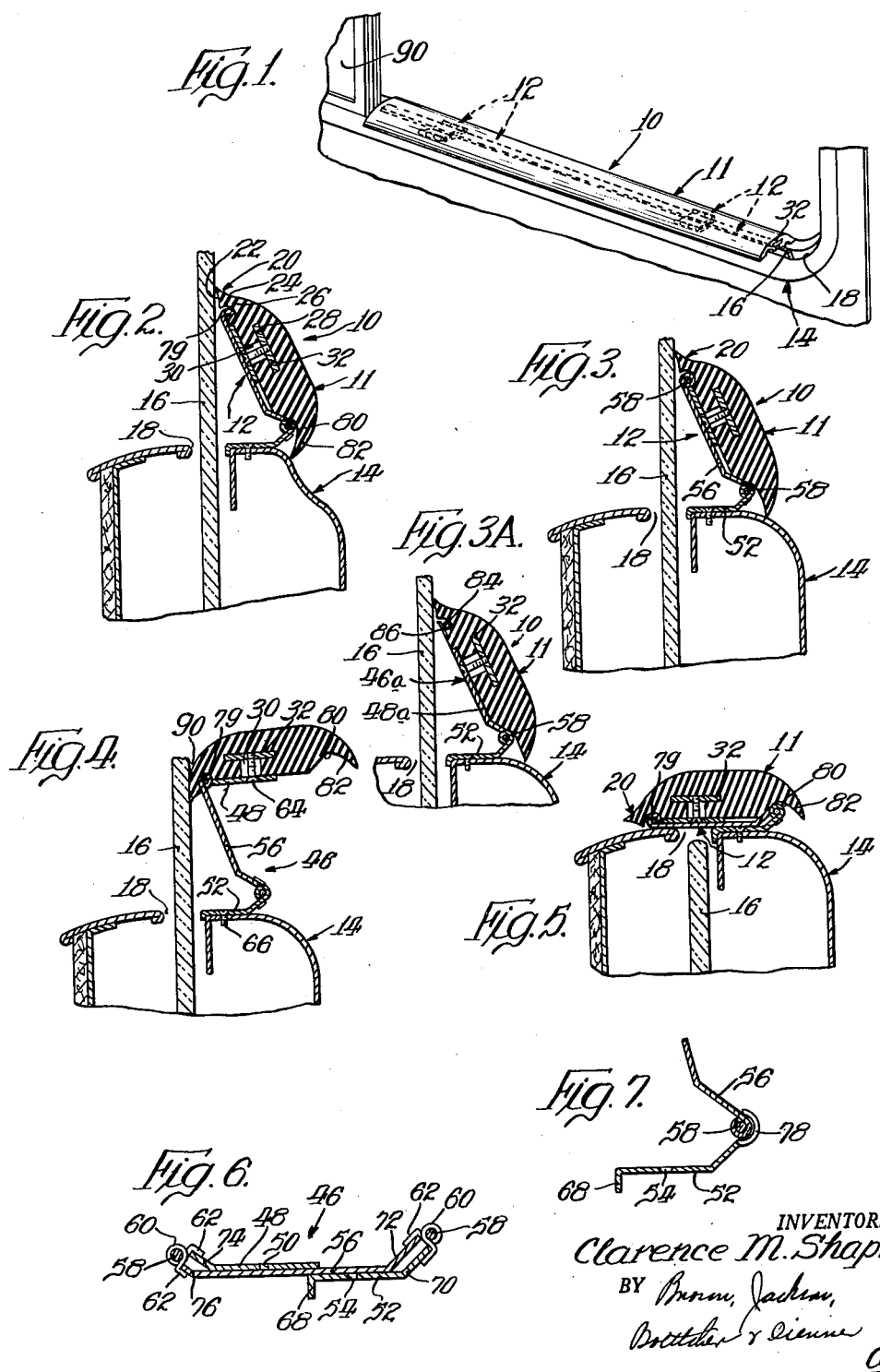

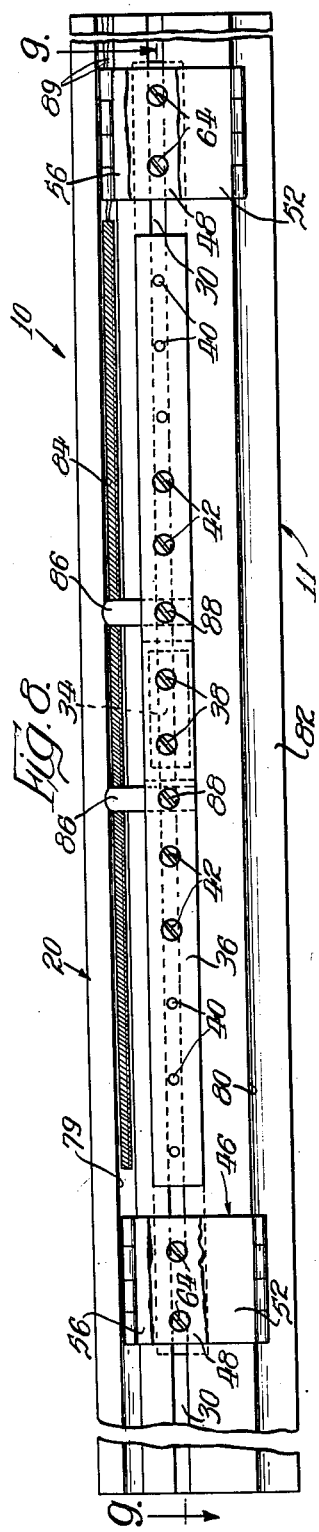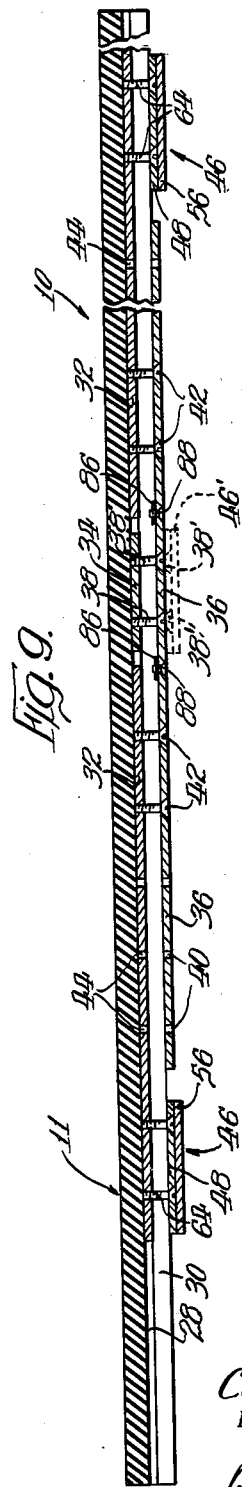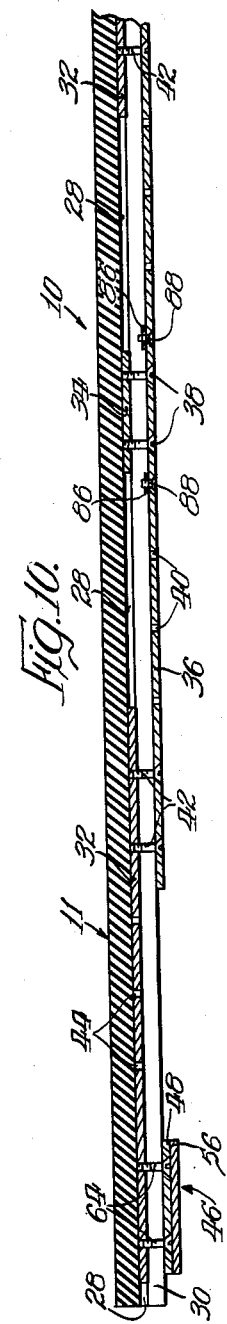

2,633,380

UNITED STATES PATENT OFFICE 2,633,380

ARMREST AND WEATHER STRIP DEVICE FOR AUTOMOBILE DOOR WINDOWS

Clarence M. Shapiro, Chicago, Ill.

Application January 18, 1951, Serial No. 206,647

22 Claims. (Cl. 296—49.2)

This invention pertains to a new and useful article of manufacture in the form of a special type of weather stripping for use in conjunction with windows of an automobile door. This application is an improvement on the invention set forth in my copending application, Serial No. 172,740, filed July 8, 1950.

Most automobile and truck doors have window glass which may be raised and lowered through a slot disposed on the lower part of the window frame portion of the door, the window glass, when completely lowered, lying inside of the door and generally having its top edge lying below, or flush with, the top of the slot and, when completely raised, generally having its side edges and top edge disposed within a groove which extends up the sides and across the top part of the window frame portion. Even when the window glass is held by its lower edge in a supporting structure, which will, when the window glass is completely raised, partially fill the slot to close it off to water, snow, dirt, etc., some water and dirt can get inside the door. This is especially true when the automobile is being washed. However, when the window is lowered, either partially or completely, then rain, snow, dirt, and the like, can get inside of the door between the glass and frame very easily, with the result that the door may rust from the inside and the operating mechanism for the window glass and door latch may rust or become damaged by water and dirt working into it. As evidence of the fact that water does get inside of the doors, it will be noted that most doors have drain holes provided at the bottom to discharge such water.

By my invention, damage to the inside of the door and to its inner mechanism, by the entry of dirt and water, may be prevented.

I provide a weather strip member which preferably is supported exteriorly of the passenger compartment and is adapted to be connected with the automobile door structure adjacent the window slot in the window frame. The weather strip member bears against the outer surface of the window glass and across the space between the glass and the adjacent outer door structure, such as the window frame portion, when the glass is raised partially or completely. The weather strip member is a generally longitudinally extending member of the same length as the automobile door window slot and it is wider than the slot in the door through which the glass is raised and lowered. When the window glass is completely lowered, the strip seats across the slot and prevents the entry of water, snow, dirt, etc., into the slot. By reason of the manner in which the weather strip member is hingedly connected with the door structure, the weather strip member is effective at all times, regardless of the height of the glass or its direction of movement.

Preferably, I form the weather strip member as a resilient cushion on which the driver or passenger may rest his arm. Not only is the cushioning effect very desirable, but the material which may be employed is a poor conductor of heat, so that the window frame portion of the door will neither burn nor chill the arm of the person who rests his elbow or arm on it.

Furthermore, since the article of my invention resiliently engages the window glass and acts between it and the adjacent door structure, it acts as an "anti-rattle" device to prevent the window glass from rattling in its frame.

The edge of the weather strip member also acts as a scraper, or squeegee, to clear the glass when there is rain or snow on the window glass and the glass is lowered.

While various means for fastening the weather strip member to the adjacent door structure may be employed, I prefer a double-hinge connection which resiliently urges the member toward the window glass and over the slot with the fastening means being concealed from view.

Since the weather strip member preferably is formed of resilient material such as rubber, so that it may also serve as a cushioning member or arm rest, and since the member is inclined upwardly and toward the window with a margin of the member being resiliently urged against the side of the window, the coefficient of friction between the rubber edge and the glass surface must be accommodated in some fashion to permit easy lowering of the window. The accommodation is conveniently and satisfactorily provided by the double-hinge connection referred to above and to be described at greater length below.

Because the width of the automobile door windows varies, it is a further object of my invention to provide fastening means selectively shiftable longitudinally of the weather strip member to accommodate the varying widths and to permit installation with ease even by an automobile owner having a minimum of tools and mechanical skill. It is a further advantage of my invention that it may be readily marketed as an attachment to be easily added by the car owner or an automobile mechanic or may be a part of the standard and original equipment of new automobiles.

It is a further object of my invention to provide a weather strip member having that margin which is adapted to engage the window glass heated in order to assist in the removal of ice and snow. It is a further object, in this connection, to provide for easy addition or removal of the heating element so that it may be optional equipment on the weather strip member.

Hereinafter, while the article of my invention will frequently be referred to as a "weather strip device," that is not intended as a denial of the other functions which the device may perform and which have been noted above.

Further objects, uses and advantages of my invention will become apparent, or be obvious, from the following description, when taken with the drawings, in which:

Figure 1 is a fragmentary perspective view, with portions of the weather strip member being broken away, illustrating the use of my invention in connection with an automobile door window, the window glass being lowered into the slot of the automobile door window frame;

Figure 2 is an enlarged cross sectional view illustrating the use of my invention in connection with an automobile door frame of particular shape, the weather strip device being in a position wherein the window glass is raised, or is being raised;

Figure 3 is a view similar to that of Figure 2 but illustrating the weather strip device employed with a differently shaped automobile door frame;

Figure 3A is a view similar to that of Figure 3 but illustrating the use of a simpler form of hinged connecting means;

Figure 4 is a view similar to that of Figure 3 but illustrating the weather strip device in a position wherein the window glass has been, or is being, lowered;

Figure 5 is a view similar to that of Figures 3 and 4 but showing the window glass withdrawn into the slot of the automobile door window frame and with the weather strip member completely across the slot;

Figure 6 is an enlarged sectional view of a fastening means by which the weather strip member is hingedly connected with the adjacent automobile door frame structure;

Figure 7 is a fragmentary view of the fastening means of Figure 6 showing the central link in a raised position corresponding to that of Figures 2 and 3;

Figure 8 is a fragmentary bottom plan view, with certain portions broken away to show structure otherwise concealed;

Figure 9 is a sectional view on the line 9—9 of Figure 8 looking in the direction of the arrows; and Figure 10 is a fragmentary sectional view similar to that of Figure 9 showing the fastening means in a different position.

Referring first to Figures 1, 2, 3, 4 and 5, there will be seen the device of my invention, indicated generally by the reference numeral 10 and hereinafter sometimes referred to as a "weather strip device." It comprises a weather strip member proper, indicated generally by the reference numeral 11, together with fastening means, indicated generally and in its entirety by the reference numeral 12. The automobile door and window frame structure is indicated generally by the reference numeral 14. The window glass 16, in Figures 1 and 5, has passed wholly into the slot 18 in the door frame structure 14.

Preferably, the weather strip member 11 is formed of rubber or a similar resilient, cushion-like material which is waterproof. Its margin, indicated generally by the reference numeral 20, which is adapted to bear against the window glass when the glass is raised, is formed with two surfaces 22 and 24 which come together to provide a thin margin, or edge, with said marginal portion 20 being connected with the remainder of the weather strip member 11 by a resilient neck portion 26. Internally of the weather strip member 11 there is disposed a central, longitudinally extending passageway 28 which is connected with the under surface of the weather strip member 11 by a longitudinally extending slot 30.

Referring now also to Figures 6 through 10, it will be seen that reinforcing means in the form of a flat strap 32, preferably of metal, is disposed in the passageway 28 and extends longitudinally of at least a portion of the weather strip member 11. In the preferred form of the invention the reinforcing means comprises two straps 32 which are adapted to be relatively movable longitudinally of the passageway 28 at the selection of the user. Disposed in the passageway 28 between the straps 32 (see Figure 8) there is a short strap or plate 34 which is relatively fixed in position in the passageway between the separable strap members 32. Another longitudinally extending strap 36, disposed on the under side of the weather strip member 11, is connected by screws, or the like, 38 to the relatively fixed short strap, or plate, 34. If desired, the under side of the weather strip member 11 may be recessed to accommodate strap 36. Strap 36 also has a plurality of additional apertures 40 through which screws 42 may pass for threaded connection in the tapped holes 44 in the two straps 32. Since each of the straps 32 has a plurality of tapped holes 44, it is possible to unthread the screws 42 therefrom and to shift the straps 32 longitudinally away from the central short strap 34, if it is desired to shift the hinged members, indicated generally by the reference numeral 46, toward the free ends of the weather strip member 11. After such shifting, the screws 42 may be inserted through other apertures 40 of the strap 36 and through the slot 30 in weather strip member 11 for threaded connection with the straps 32. In this way the user may shift the position of the hinged members 46 longitudinally of the weather strip member 11 in order to locate them where desired, for connection with the automobile door window frame.

Each hinged member 46 comprises an arm 48 having a pair of apertures 50 (see Figure 6) and an arm 52 having a pair of apertures 54, with each of the arms being hingedly connected with opposite ends of a link 56, as by hinge pins 58. At each hinged connection there is resilient means, preferably in the form of a spring 60, having ends 62 which act between the link 56 and the two arms 48 and 52 in such a manner as to urge the arms and link into superimposed position with respect to each other and therefore urge the weather strip member into a position over the slot 18 in the door frame 14. Consequently, the resilient hinged connections always urge the weather strip member against the glass when it is in raised or partially raised position. Arm 48 of the hinged member 46 is connected by screws, or the like, 64, through the apertures 50 in the arm 48 and through the slot 30 in the weather strip member 11, with the tapped holes 44 of strap 32. The arm 52 is connected by screws, or the like, 66, through the apertures 54 of arm 52, with the automobile door window frame 14, as shown clearly in Figures 2 through 5. Arm 52 has a downwardly turned end 68 which serves as a locating means and means for preventing shifting of the hinged member 46 outwardly from the window glass.

Preferably, arm 52 of the hinged member 46 has its end 70, which is adjacent the hinge pin 58, upwardly directed at an angle and the link 56 adjacent the corresponding pivot pin 58 has a complementary end 72 upturned in the same direction. Also, arm 48 adjacent its hinge connection with the link 56 has its end 74 upwardly turned and the adjacent end 76 of link 56 is upwardly turned in a complementary manner. Having the ends upturned, as just described, permits the hinge connections and their springs 60 to be positioned above the adjacent top surface of the window frame structure 14 and, therefore, allows hinged member 46 to seat flush across the slot 18 in the window frame 14 when the window glass is completely lowered. Therefore, no rotating hinged ends of the arms and link will engage the top surface of the door frame 14 either inwardly or outwardly with respect to the window glass. This will prevent marring of the surface of the window frame.

As can be observed most clearly from Figure 7, the arm 52 may include an extension 78 which will form a stop means which limits movement of the link 56 in a direction away from the window glass 16. Consequently, when the window glass is raised and the door is locked, as will frequently be the case when a car is parked and left alone, it will be difficult, if not impossible, to get at and loosen the screws 66 by which arm 52 is secured to the automobile door frame 14. This will prevent undesired removal of the weather strip device 10. However, it will not prevent easy securing of the device to the door frame or removal therefrom when the window glass is down. It will be appreciated that the stop member, or extension, 78 can be formed on the link 56 instead of on the arm 52. A similar arrangement may be employed at the other hinged connection for limiting the extent of hinged movement between the arm 48 and the link 56, if desired.

In the preferred form of the invention, the weather strip member 11 is recessed on its under surface first to accommodate the thickness of the arm 48 and the link 56 and also to accommodate the hinged connections at either end of link 56. At the hinged connection between arm 52 and link 56 the weather strip member 11 has not only a recess 80 but there is also an extension 82 which is adapted to overhang the hinged connection and to engage the surface of the automobile door window frame 14 when the window is in raised position. This can best be seen from Figures 2 and 3. In Figure 2 one of the usual forms of automobile door frame exterior is illustrated, and in Figure 3 another common form of exterior automobile door window frame is illustrated. The resilient extension 82 which may engage the surface of the door window frame 14 in Figure 2, flexes the necessary amount when it is employed in connection with an automobile door window frame having a different curvature, such as that shown in Figure 3. It will also be observed that upturning of the ends 70 and 72 of the arm 52 and link 56, respectively, makes possible the use of the extension 82 without undue interference with the surface of the door window frame 14 when the weather strip member 11 is pivoted to its upwardly inclined position, as shown in Figures 2 and 3.

As may be best seen from Figures 8 and 9, a longitudinally extending heating element 84 may be disposed between the hinged members 46 in the groove 79 which accommodates the hinged connection between arm 48 and link 56 of the hinge members 46. The heating element 84 may be held in position by a pair of clips 86 which are secured to the strap 36 as by screws 88. The electric leads 89 from the heating element 84 may pass out of the end of the groove 79 and beneath a vent window, for example, such as the window 90 of Figure 1, to an electric switch (not shown) inside of the passenger compartment and then through appropriate connections to the automobile battery.

It will be seen that the neck portion 26 (Figure 2) of the window engaging margin 20 of the weather strip member 11 is defined in part by the groove 79. Groove 79 is sufficiently close to the window engaging margin that the heating element disposed therein may assist in removing snow or ice formations on the window glass 16. However, in climates where freezing weather is not encountered, the heating element 84 and its clips 86 may be dispensed with.

It will be appreciated that if the ability to separate the hinges is not desired, the reinforcing straps 32 and short strap 34 could be formed as one continuous member. In that event, a strap 36 would not be needed. It will also be appreciated that it would be possible to employ a single hinged member 46, centrally located with respect to the weather strip member 11, and my invention contemplates such construction, whether or not a single reinforcing member is employed in place of the straps 32, 34 and 36. For example, in Figure 9, a single hinged member could be located as shown at 46' in dotted lines. Screws 38' could then be employed to connect hinged member 46' to the plate, or strap, 34.

While double hinged members 46 are presently preferred, it is possible to employ a single hinged member, such as member 46a of Figure 3A, when the weather strip member 11 is so formed as to have such a low coefficient of friction with respect to the window glass that no binding action on the window would result. In place of link 56 and arm 48 a single arm 48a is hingedly connected by pin 58 to arm 52. Such a single hinged member 46a could be employed in pairs and be secured to the straps 32 of the extensible reinforcing means, or a single hinged member 46a could be employed centrally in the manner indicated in Figure 9 at 46'. Also, one or more single hinged members could be employed in conjunction with a single, non-extensible, reinforcing member located in passageway 28.

Assuming now that the person proposing to install the weather strip member has separated the hinged members 46 appropriately for the connection desired with the automobile door window frame 14 and has secured the device 10 in place, so that it assumes the position shown in Figure 5 over the slot 18 in the door window frame 14, the user may then raise the window and the weather strip member 11 will move upwardly as the top edge of the window glass 16 engages the link 56 at its under surface. The hinged movement will be around the hinged connection at pivot pin 58 on the righthand side, as viewed in Figures 2 through 5, and the glass will finally be raised to a position wherein the weather strip member 11 is raised to the position shown in Figure 3. So long as the glass is raised, or is being raised, the position of Figure 3 will prevail. If the glass is dry when it is thereafter lowered, the coefficient of friction between its outer surface and the window engaging margin 20 of weather strip member 11 will be sufficient that the weather strip member 11 will pivot about its left-hand hinge connection, as viewed in Figures 2 through 5, to a position such as that illustrated in Figure 4. During the window lowering operation the margin 20 of member 11 will serve as a squeegee. However, if the outer surface of the window 16 is sufficiently wet, the weather strip member may retain the position substantially like that of Figure 3 and will clear off the glass. If, however, the weather strip member 11 assumes the position shown in Figure 4 and is serving as a squeegee when the window is being lowered, some water may collect in the groove 90 formed between the outer surface of the window glass and the adjacent margin of the member 11. So that it will not be discharged into the interior of the car, it is only necessary to raise the window a slight amount at that time when the top edge of the glass is almost completely lowered to the margin of member 11 whereupon member 11 will be moved to the position shown in Figure 3 and will discharge any water which has accumulated. The window may then be entirely lowered to the position shown in Figure 5, whereupon the weather strip member 11 will assume a position completely across the slot 18 and will prevent the entrance of any rain, snow, dirt, or the like, and may serve as a cushion member for the driver's arm.

While I have illustrated a preferred embodiment of the invention for purposes of illustration, I do not intend to be limited thereto, except insofar as the following claims are so limited, since various changes and modifications coming within the scope of the invention and claims will suggest themselves to others by reason of my disclosure.

I claim:

1. A new article of manufacture for use in conjunction with an automobile door window comprising a weather strip member of a length adapted to correspond to the length of the window slot in an automobile door and of a width greater than said slot, and double hinged fastening means for connecting the weather strip member with the automobile door structure, said weather strip member being secured to said fastening means for double hinge-like movement from a raised position, wherein it bears against the window glass when the latter is raised, to a different angular position wherein it bears against the window glass when the latter is lowered, and thence to a position over said slot when the window glass is lowered through said slot.

2. A new article of manufacture for use in conjunction with an automobile door window comprising a weather strip member of a length adapted to correspond to the length of the window slot in an automobile door and of a width greater than said slot, at least one double hinged fastener for connecting said weather strip member with the automobile door structure, said double hinged fastener including a link element having a hinged connection at one end with the weather strip member and adapted to have a hinge connection at its other end with the automobile door structure, and resilient means urging said weather strip member toward the window glass.

3. The article of claim 2 together with stop means limiting movement of said weather strip member away from said window glass.

4. The article of claim 2 wherein the under surface of said weather strip member is recessed to accommodate said link.

5. A new article of manufacture for use in conjunction with an automobile door window comprising a weather strip member of a length adapted to correspond to the length of the window slot in an automobile door and of a width greater than said slot, at least one double hinged fastener for connecting the weather strip member with the automobile door structure, said double hinged fastener having one arm connected with the weather strip member and another arm adapted to be connected with the automobile door structure and a connecting link hingedly connected with opposite ends of said arms, whereby said arms and link may, in one position of the weather strip member, assume a superimposed position beneath said member.

6. The article of claim 5 wherein each hinged connection has resilient means urging the arms and link into superimposed position.

7. The article of claim 6 wherein the arm of the double hinged fastener which is adapted to be connected with the automobile structure has its end, which is farther from the window slot, inclined upwardly to its hinged connection with the link, and the link has its adjacent end formed in a complementary shape, and the weather strip member has a recess accommodating said inclined ends and hinged connection.

8. The article of claim 7 wherein the weather strip member has a resilient portion overhanging said inclined ends and hinged connection, said portion protecting the hinged connection and, in a raised position of the member, being adapted to engage the surface of the automobile door structure.

9. A new article of manufacture for use in conjunction with an automobile door window comprising a weather strip member of a length adapted to correspond to the length of the window slot in an automobile door and of a width greater than said slot, at least one double hinged fastener for connecting the weather strip member with the automobile door structure, said double hinged fastener having one arm connected with the weather strip member and another arm adapted to be connected with the automobile door structure and a connecting link hingedly connected with opposite ends of said arms, whereby said arms and link may, in one position of the weather strip member, assume a superimposed position beneath said member, a longitudinally extending passageway in said weather strip member, reinforcing means in said passageway, one arm of said double hinged fastener being connected with said reinforcing member.

10. A new article of manufacture for use in conjunction with an automobile door window comprising a weather strip member of a length adapted to correspond to the length of the window slot in an automobile door and of a width greater than said slot, at least one hinged fastener for connecting said weather strip member with the automobile door structure, a longitudinally extending passageway in said weather strip member communicating with the underside of said weather strip member, a longitudinally extending strap in said passageway, said hinged fastener including an arm connected with said strap in said weather strip member and an arm adapted to be connected with the automobile door structure, and a heating element carried by said weather strip member along that margin which is adapted to engage the window glass.

11. A new article of manufacture for use in conjunction with an automobile door window comprising a weather strip member of a length adapted to correspond to the length of the window slot in an automobile door and of a width greater than said slot, at least one double hinged fastener for connecting the weather strip member with the automobile door structure, said double hinged fastener having one arm connected with the weather strip member and another arm adapted to be connected with the automobile door structure and a connecting link hingedly connected with opposite ends of said arms, whereby said arms and link may, in one position of the weather strip member, assume a superimposed position beneath said member, said weather strip member having a window engaging portion formed with two surfaces coming together to provide a thin margin with said portion being connected with the remainder of the member by a resilient neck portion.

12. The article of claim 11 wherein the neck portion is defined in part by a groove in the under surface of the weather strip member, and a heating element is disposed in said groove.

13. A new article of manufacture for use in conjunction with an automobile door window comprising a weather strip member of a length adapted to correspond to the length of the window slot in an automobile door and of a width greater than said slot, at least one hinged fastener for connecting said weather strip member with the automobile door structure, a longitudinally extending passageway in said weather strip member communicating with the under side of said weather strip member, and a longitudinally extending strap in said passageway, said strap being selectively movable longitudinally of said passageway, said hinged fastener including an arm connected to said strap and an arm adapted to be connected with the automobile door structure.

14. A new article of manufacture for use in conjunction with an automobile door window comprising a weather strip member of a length adapted to correspond to the length of the window slot in an automobile door and of a width greater than said slot, a longitudinally extending passageway in said weather strip member, reinforcing means in said passageway, said reinforcing means including a pair of longitudinally separable members adapted to be movable in said passageway to selected positions, a pair of double hinged fasteners for connecting said weather strip member with the automobile door structure, each double hinged fastener including a link element having a hinged connection at one end with one of said separable members of the reinforcing means, and adapted to have a hinged connection at its other end with the automobile door structure.

15. The article of claim 14 together with resilient means urging said weather strip member toward the window glass, and stop means limiting movement of said member away from said glass.

16. A new article of manufacture for use in conjunction with an automobile door window comprising a weather strip member of a length adapted to correspond to the length of the window slot in an automobile door and of a width greater than said slot, a longitudinally extending passageway in said weather strip member connected to the under surface of said member by a longitudinally extending slot, reinforcing means in said passageway, said reinforcing means including a pair of longitudinally separable members adapted to be movable in said passageway to selected positions, a relatively fixed member disposed between said separable members in said passageway, a longitudinally extending strap on the under surface of said weather strip member connected with said relatively fixed member, a pair of double hinged fasteners for connecting said weather strip member with said automobile door structure, each double hinged fastener comprising an arm connected with one of said separable members of the reinforcing means, and an arm adapted to be connected with said automobile door structure and a connecting link hingedly connected with opposite ends of said arms, said relatively separable members being connectable with opposite portions of said strap at a plurality of different locations at the selection of the user whereby said double hinged fasteners may be separated varying distances.

17. The article of claim 16 wherein the length of the weather strip member exceeds the combined lengths of said separable members and relatively fixed member of the reinforcing means.

18. The article of claim 16 wherein each hinged connection has resilient means urging the arms and link into superimposed position beneath the weather strip member.

19. The article of claim 18 wherein the under surface of said weather strip member is recessed to accommodate the hinged connection and at least one arm of each of the double hinged fasteners.

20. The article of claim 19 together with a heating element, said heating element being carried in the recess for the hinged connection which is closest to the window engaging margin of the weather strip member.

21. A new article of manufacture for use in conjunction with an automobile door window comprising a weather strip member of a length adapted to correspond to the length of the window slot in an automobile door and of a width greater than said slot, at least one hinged fastener for connecting said weather strip member with the automobile door structure, a longitudinally extending passageway in said weather strip member, a slot in said weather strip member establishing communication between said passageway and the underside of said weather strip member, and a longitudinally extending strap in said passageway, said strap being selectively movable longitudinally of said passageway, said hinged fastener including an arm connected through said slot to said strap, and movable with said strap, and an arm adapted to be connected with the automobile door structure.

22. A new article of manufacture for use in conjunction with an automobile door window comprising a weather strip member of a length adapted to correspond to the length of the window slot in an automobile door and of a width greater than said slot, at least one hinged fastener for connecting said weather strip member with the automobile door structure, a longitudinally extending passageway in said weather strip member communicating with the underside of said weather strip member, and a plurality of longitudinally extending straps in said passageway, said straps being selectively movable longitudinally of said passageway, said hinged fastener including an arm connected to at least one of said straps and an arm adapted to be connected with the automobile door structure.

CLARENCE M. SHAPIRO.

REFERENCES CITED

The following references are of record in the file of this patent:

UNITED STATES PATENTS

| Number | Name | Date |
| --- | --- | --- |
| 991,140 | Davis | May 2, 1911 |
| 1,393,192 | Baker | Oct. 11, 1921 |
| 1,595,874 | Ruckel | Aug. 10, 1926 |
| 1,962,508 | Josselyn | June 12, 1934 |
| 2,274,026 | Allen | Feb. 24, 1942 |
| 2,371,430 | De Patto | Mar. 13, 1945 |